Nov. 25, 1969  J. H. HUGHES  3,480,050
SHAKE-SAWING MACHINE
Filed Aug. 25, 1965  4 Sheets-Sheet 2
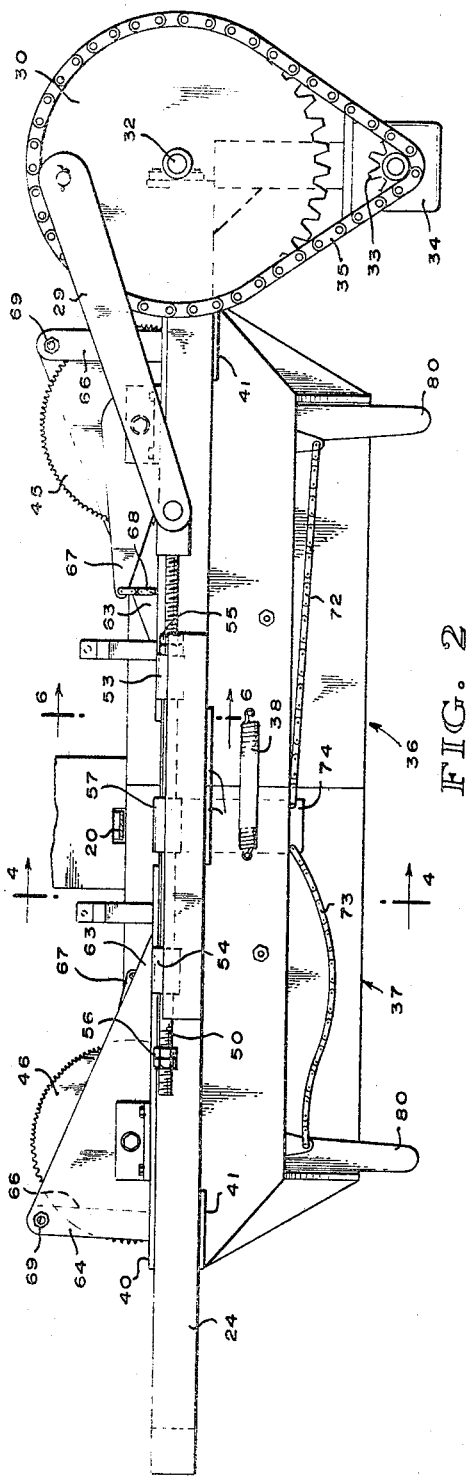
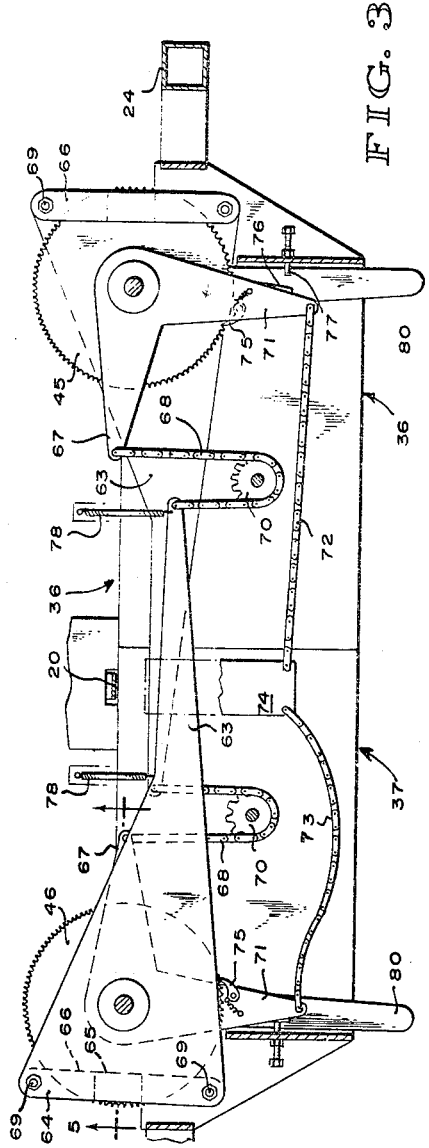
JOHN H. HUGHES
INVENTOR.
BY *Seed & Berry*
ATTORNEYS Nov. 25, 1969   J. H. HUGHES   3,480,050
SHAKE-SAWING MACHINE
Filed Aug. 25, 1965   4 Sheets-Sheet 3

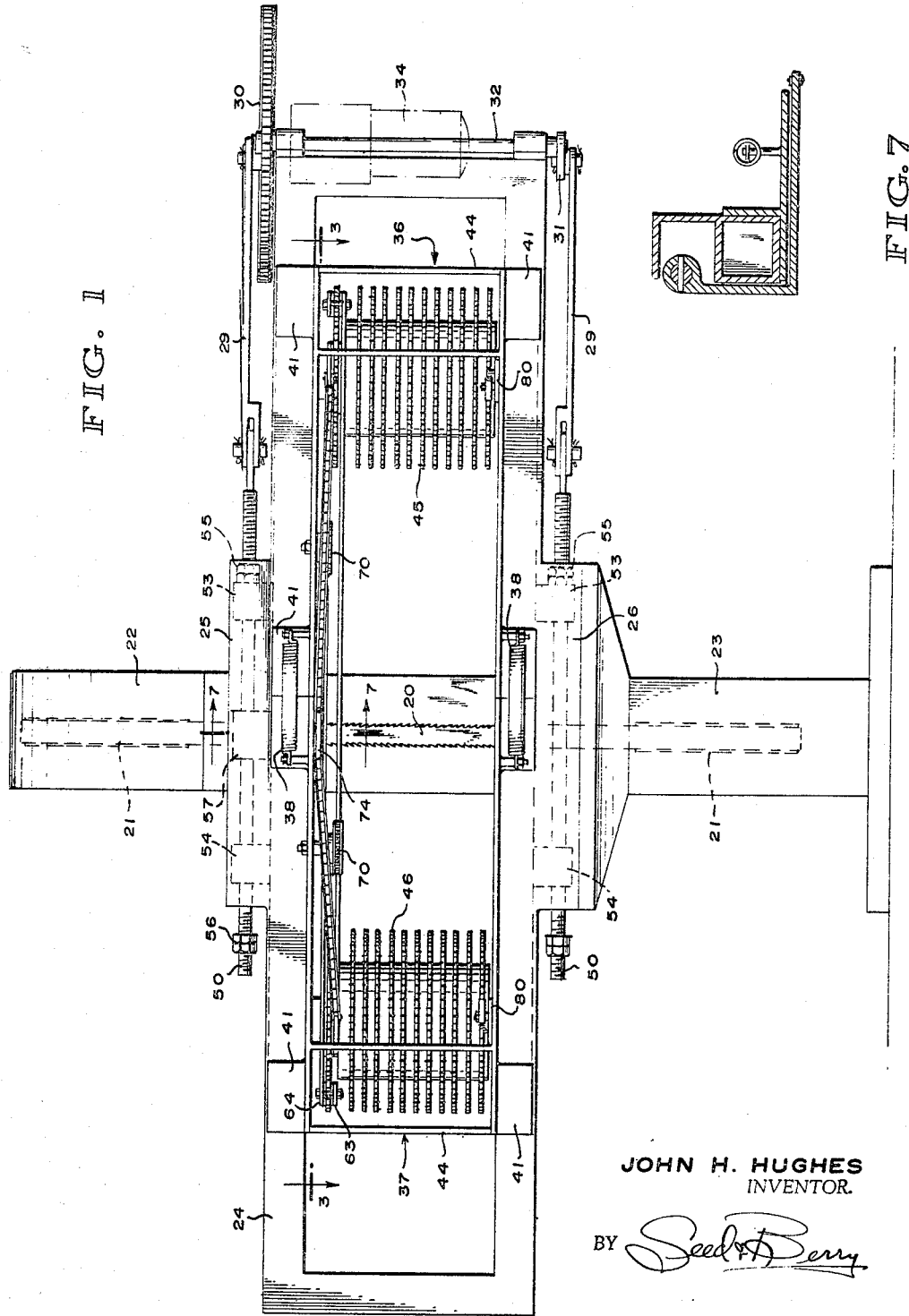

JOHN H. HUGHES
INVENTOR.

BY *Seed & Berry*

ATTORNEYS

Nov. 25, 1969     J. H. HUGHES     3,480,050
SHAKE-SAWING MACHINE
Filed Aug. 25, 1965     4 Sheets-Sheet 4
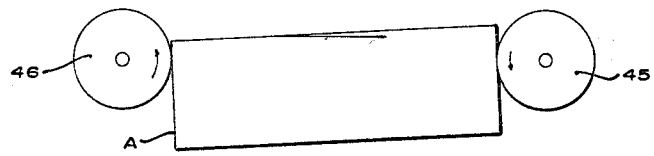
FIG. 10
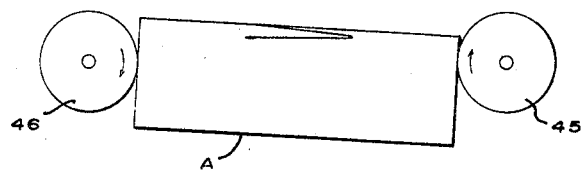
FIG. 11
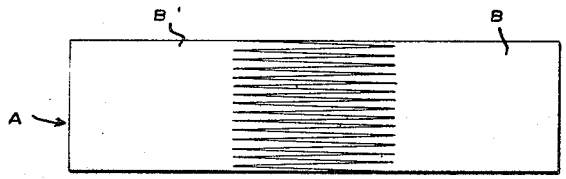
FIG. 12
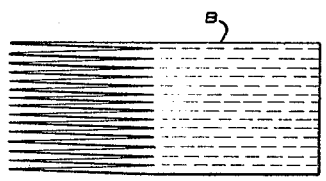
FIG. 14
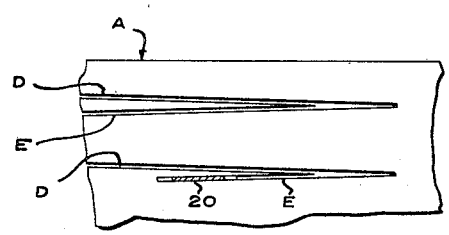
FIG. 13
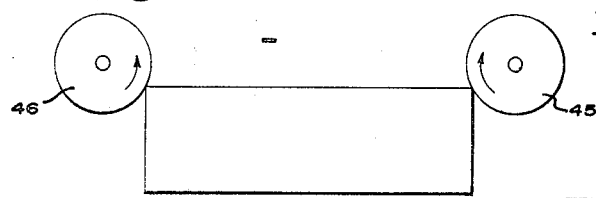
FIG. 8
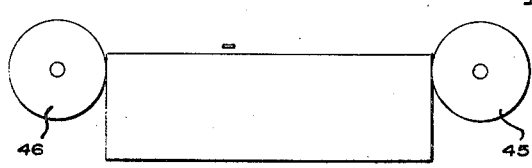
FIG. 9
JOHN H. HUGHES
INVENTOR.
BY 
ATTORNEYS United States Patent Office 3,480,050
Patented Nov. 25, 1969

3,480,050
SHAKE-SAWING MACHINE
John H. Hughes, 6321 Central Park Drive,
Aberdeen, Wash. 98520
Filed Aug. 25, 1965, Ser. No. 482,549
Int. Cl. B27b 3/22
U.S. Cl. 143—26                    10 Claims

ABSTRACT OF THE DISCLOSURE

A machine for producing a bisecting zig-zag kerf in a shake bolt, employing a double-edged saw blade travelling endwise to its length and giving to the bolt a succession of 4-stage cyclical movements, the second and fourth stages being each a respective one of two oppositely directed strokes of reciprocation shuttling the bolt along a linear travel path which includes the saw blade and is longitudinal to the blade's cutting plane, the first and third stages being each one of two oppositely directed rocking movements in which the bolt turns about a respective center which lies intermediate the ends of the bolt and approximately coincides with the saw blade and positions the bolt so that its longitudinal median line is moderately inclined in opposite directions from said linear travel path.

---

This invention relates to a machine for producing shake blocks, and particularly a shake block in which one of the ends is sawed in a manner giving said end a multi-toothed profile configuration with the produced notches deeply indented and V-shaped and with the flanking walls steeply inclined. Shakes are produced from said block through the expedient of introducing a gang of splitting knives into the several notches and forcefully driving the same through the block. My prior application for letters patent of the United States filed Jan. 18, 1965, Ser. No. 426,254, is directed to the method of sawing the block and splitting the sawed block into shakes. I am filing an application for letters patent of the United States directed to a machine for splitting the sawed block. The sawed block is obtained from a bolt considerably longer than the shakes which are to be produced, say half again longer, and the sawing step is performed by a narrow double-edged bandsaw blade upon a center portion of the bolt. A saw kerf is initiated at one side face of said center portion, and thence progresses the width of the bolt tracing a continuous uniform zig-zag path in which each of the successive oppositely directed linear lines of travel are moderately inclined one from another and from the side faces of the bolt. As the saw blade emerges from the bolt upon the completion of its zig-zag cut, there are perforce produced two of the end-notched shake blocks.

For its general object the present invention aims to provide a machine for efficiently performing said zig-zag sawing of the bolt. More especially the invention aims to provide a machine having a saw with a narrow blade capable of making a cut of the desired zig-zag pattern in a clear wood bolt where the bolt and the saw blade are moved, one relative to the other, in a prescribed manner necessary to obtain said zig-zag cut, in association with means for establishing said relative motion.

These and more particular objects and advantages of the invention will appear and be understood in the course of the following description and claims, the invention consisting in the novel construction and in the adaptation and combination of parts hereinafter described and claimed.

In the accompany drawings:

FIGURE 1 is a front elevational view illustrating a machine constructed to embody preferred teachings of the present invention.

FIG. 2 is a fragmentary top plan view thereof.

FIG. 3 is a fragmentary horizontal sectional view on line 3—3 of FIG. 1.

FIG. 7 is a fragmentary transverse vertical sectional view drawn to an enlarged scale on line 7—7 of FIG. 1.

FIGS. 8, 9, 10 and 11 are schematic views illustrating the shake bolt at various stages of the operation.

FIG. 12 is a view illustrating a shake bolt as it appears upon the completion of a sawing operation, the scale used being enlarged from that employed in said schematic views.

FIG. 13 is a fragmentary enlarged-scale view detailing the progress of the saw blade in tracing its zig-zag travel path, the blade being shown in section; and FIG. 14 is a view illustrating one of the two shake blocks obtained from the sawed bolt, and indicating by broken lines the planes along which the block is split into multiple shakes.

Figure 4:
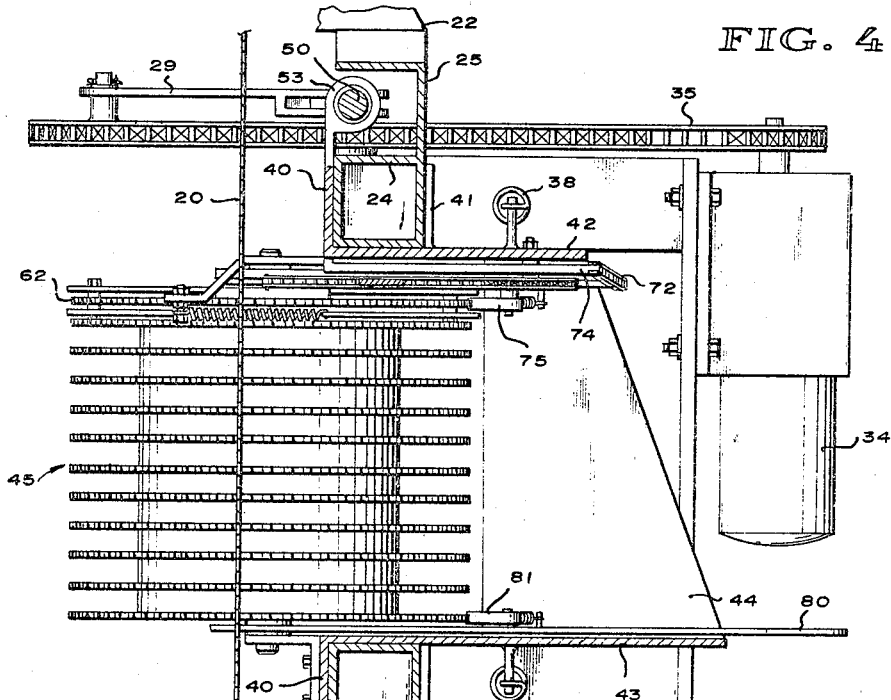
FIG. 4 is a fragmentary transverse vertical sectional view drawn to an enlarged scale on line 4—4 of FIG. 2.
Figure 6:
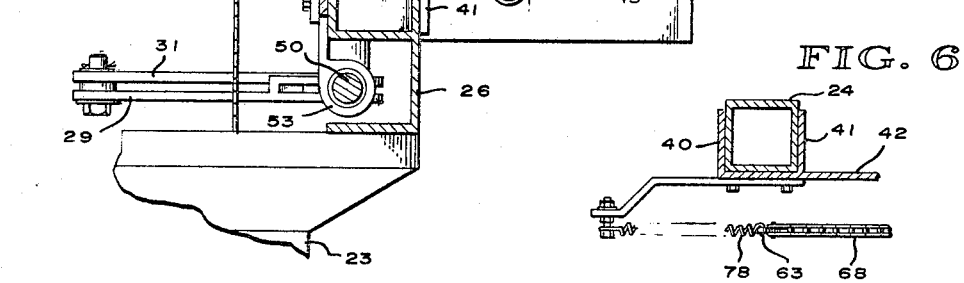
FIG. 6 is a fragmentary transverse vertical sectional view drawn to an enlarged scale on line 6—6 of FIG. 2.
Figure 5:
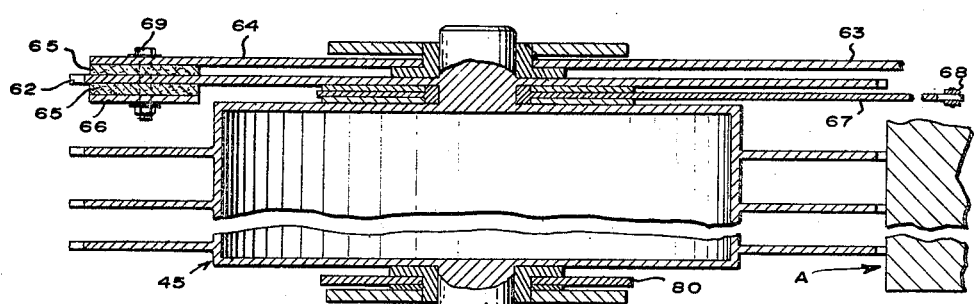
FIG. 5 is a fragmentary longitudinal vertical sectional view drawn to an enlarged scale on line 5—5 of FIG. 3.

It is believed that clarity in an understanding of the nature of the present machine will be advanced by here having reference to FIGS. 12, 13 and 14 and cursorily describing the manner in which a narrow and thin double-edged saw blade is made to cut a zig-zag kerf in a shake bolt A, the cut running the entire width of the bolt, entering at one side thereof and emerging from the other side so that, upon completion of the saw blade's zig-zag travel the bolt is divided into two more or less identical shake blocks B and B' each of which presents at one of its ends a multiplicity of deeply indented V-shaped notches C having the flanking surfaces steeply inclined. Relative motion as between the bolt and the saw-blade accomplishes the zig-zag cutting and this relative motion is desirably one in which the saw blade, designated by the numeral 20, occupies a localized station and the bolt moves. This movement is performed by a shuttling carriage, and the reciprocal shuttle travel may be said to comprise the second and fourth stages of a repeating 4-stage cycle. In the first and third stages the bolt is manipulated upon the carriage. In the first stage it is cocked in one direction and in the third stage it is cocked in the opposite direction, in each instance a predetermined like degree about the saw-blade as an axis, so that the kerfs D and E which the saw blade cuts in the second and fourth stages of the cycle are angled in opposite directions from the longitudinal plane of the bolt and progress transversely of the bolt, the terminating end of the second-stage cut coinciding with the initiating end of the fourth-stage cut. By the same token the terminating end of a fourth-stage cut coincides with the initiating end of a second-stage cut of the following cycle.

Proceeding now to describe the machine, the saw blade is desirably a bandsaw blade trained in the usual manner over upper and lower pulleys 21, one live. Giving support to the pulleys is a hollow frame formed to a C-shape so as to produce a single back leg (not shown) and separated upper and lower front legs 22 and 23, respectively. The blade is exposed in its vertical traversal of the throat which is defined between said separated front legs.

The present machine adds to the main frame of the bandsaw a secondary frame comprised of a horizontally elongated box-section loop 24, rectangular in shape, extending transversely of the throat in a vertical plane which lies normal to and moderately offset to the front from the plane which the saw blade occupies in its exposed travel. Angle-bars 25 and 26 are welded or otherwise made integral with the loop for rigidly securing the loop in centered relation to said frame of the bandsaw. The loop 24 serves as a guide for the reciprocal slide motion of a carriage which is powered by a pair (upper and lower) of crank-driven connecting rods 29 in a manner hereinafter to be described. A crank wheel 30 for the upper rod and a crank arm 31 for the lower rod are fixed to the upper and lower ends of a crank shaft 32 journaled at one end of the loop for rotation about a vertical axis. Sprocket teeth are provided in the perimeter of the crank wheel, and a sprocket wheel 33 driven by an electric motor 34 acts through a chain 35 to provide a reduction drive to the crank wheel.

The carriage occupies a position within the opening of the loop and is made in two sections 36 and 37 which are yieldingly urged one toward the other by strong springs 38. Each carriage section bears by its side edges against the facing inner walls of the loop, and has slippers 40 and 41 which overlie the side surfaces of the loop to maintain the sections against lateral displacement from the loop. This is perhaps best illustrated in FIG. 4, wherein it is also seen that these slippers extend upwardly from a horizontal head wall 42 and downwardly from a horizontal floor wall 43 which is spaced below the head wall and is joined thereto by ribs 44. Each carriage section has a respective one of two rolls, as 45 and 46, journaled in the space between said head and floor walls for rotation about longitudinally spaced paralleling vertical axes. On each roll and welded or otherwise made rigid therewith are a multiplicity of vertically spaced matching disc-like wheels provided about the perimeters with closely spaced spurs. These spur teeth are somewhat pointed so as to take a bite upon the end of a shake bolt introduced between the two rolls. The spur-toothed rolls, in effect, act as opposing jaws yieldingly urged by the springs 38 against the opposite ends of the shake bolt. The rotary motions to which the spur rolls admit are reciprocal, and this is to say that each spur roll is turned in opposite directions alternately, clockwise in one stage and counter-clockwise in the next stage. The stages occur intermittently in intervals between oppositely directed slide motions of the carriage. In each such stage both spur wheels turn in the same rotary direction but in different degrees, the superior travel being given first to one and then to the other spur wheel. The difference in the degree of travel is in general correspondence with the ratio between the travel of the carriage and the over-all length of the bolt A. As a consequence a shake bolt gripped between the spur rolls is intermittently rocked by the rolls. This rocking, alternating in its occurrence with the travel strokes of the carriage, gives to the shake bolt the above-described interrupted progress through the plane occupied by the bandsaw blade, working "crabwise" first in one direction and then in the opposite direction as the carriage moves in said reciprocal slide travel.

Responsible for the controlled slide travel of the carriage are two slide rods 50 each driven from a respective one of the two connecting rods 29 and mounted for horizontal movement longitudinally of the loop in positions one above and one below the loop. The upper of the two rods is also responsible for the controlled turning motion of the spur rolls. Arms prolonged from the slippers 40 of the carriage sections are formed terminally with centerbored ears, as 53 and 54, through which the slide rods work. Respective jamb-nut assemblies 55 and 56 are carried for endwise adjustment on the opposite ends of each slide rod. The former has a lost-motion push action upon the proximal ear 53 as the slide rod moves in its outward stroke of reciprocation. The latter has a lost-motion pull action upon the distal ear 54 as the slide rod moves in its inward stroke. The two sections of the carriage with a shake bolt gripped therebetween move together in concert as either the nuts 55 or the nuts 56 are brought against the related ears.

A rather wide space is provided between said two ears 53 and 54 as an accommodation to endwise movement, relative to said ears, of a shuttle-collar 57 which is pinned or otherwise fixed to the upper slide rod in a position more or less centered with respect to the sets of related ears 53 and 54. This relative endwise movement takes place as the slide rods initiate each of their oppositely directed strokes of reciprocation, and namely before either the nuts 55 or the nuts 56, as the case may be, are brought into contact with the ears 53 or the ears 54. This relative endwise movement acts through two sets of levers—one set for each spur roll—to transmit to the spur rolls the above-described turning motions so that the shake bolt is first rocked in one direction before the carriage moves in one stroke of its reciprocation and then rocked in the opposite direction before the carriage moves in its other stroke of reciprocation.

There are two levers in each of said two sets. For clarity in description, and also giving functioning significance to the levers, the two levers of each set will be hereinafter termed the advance lever and the retract lever, respectively. Both are journaled upon the respective axle 59 which carries the related spur roll so that the fulcrums coincide with the rotary center of the rolls. Each set lies at the related roll, one at one side and the other at the other side of the uppermost spur wheel, and are placed so that each of the two advance levers lies coplanar with the retract lever of the other roll.

The retract lever is a first-order lever having a long inwardly directed power arm 63 and a short outwardly directed reaction arm 64. The rim of wheel 62 is frictionally gripped between two brake-shoe facings 65 one carried by said reaction arm and the other by a tensioning bar 66 attached by adjusting bolts 69 to the reaction arm.

The advance lever is a bell-crank. Its reaction arm 67 is directed inwardly into close proximity to the power arm 63, and the two swing oppositely in concert by means of a connecting chain 68 passing about an idler sprocket wheel 70. Reaction arm 67 has a length substantially less than that of the retract lever's power arm, the ratio corresponding to the difference in length between the mean travel stroke of the carriage and the overall length of the bolt A. The power arm 71 of each bell-crank lies normal to the path travelled by the upper of said slide rods 50 and is activated by a respective one of two oppositely extending chains, as 72 and 73, which link the power arm to the horizontal branch of an L-shaped shuttle arm 74. This branch underlies the head walls 42 of the carriage sections. The other branch is made integral with the shuttle-collar 57 and depends tangentially therefrom in much the same plane as that occupied by the slippers 40.

A respective spring-pressed dog 75 is carried by the power arm of each bell-crank for ratcheting engagement with the peripheral spur teeth of the wheel 62, causing the latter to turn with the power arm as such arm is swung inwardly by a pull from the related length of chain 72 or 73. Also carried by such power arm is a pad 76 which by engagement with an adjustable stop 77 limits the return motion of the power arm. This return or backing-off motion takes place when the chain 68 slacks off. A spring 78 then acts upon the power arm of the concerned retract lever and through the related chain 68 feeds back through the reaction arm of the related advance lever to draw the latter's power arm back against the stop 77. In this way the stop adjustment controls the movement of both advance and retract levers on the respective opposite carriage sections.

The machine as presently constructed is designed to handle shake bolts between 38" and 42" in length. The span between the spur rolls determines the minimum length, which perforce must moderately exceed such span in order that the springs 38 can exert their contraction force in gripping the bolt tightly between said rolls. The bolt is first fed inwardly as close to the blade of the bandsaw as the contracted span of the spur rolls permits, and is then worked inwardly until it is brought into close proximity to the blade by turning both of the rolls in an advance direction. This is to say, considered from the vantage point of FIGS. 1 and 2, and 8 through 11, inclusive, that the roll 45 is turned in a clockwise direction and the roll 46 in a counterclockwise direction. This "feed-in" turning motion, while it admits to power operation, is presently performed manually by means of hand levers 80 underlying the lowermost spur wheel in each roll and swinging about the rotary center of the roll as an axis. Spring-pressed dogs 81 (see FIG. 4) which are substantial counterparts of the dogs 75 are carried by said hand levers. This "feed-in" action will be readily understood from an inspection of FIGS. 8 and 9, wherein the bolt is denoted by the letter B. With the bolt so placed, the motor 34 is energized, and assuming that the relative positions of the bolt, the spur rolls, and the saw blade are as shown in FIG. 9, the initial action which takes place as the slide rod moves from right to left is to take up slack in chain 72 and cause the right-hand advance lever to turn in a clockwise direction. Responsive thereto such advance lever acts through its dog 75 to turn the roll 45 clockwise and, working through chain 68 to the power arm 63 of the left-hand retract lever, also turns the spur roll 46 clockwise, the latter motion being a result of the friction grip of the brake shoes 65 upon the spur roll 46. The rim travel of the roll 45—by reason of the arithmetical difference between the advance lever and the retract lever—is three times that of the roll 46, and the right-hand end of the gripped bolt is thus advanced and the left-hand end retracted in corresponding different degrees, say ¾" and ¼". Further travel of the slide rod now brings the nuts 55 against the ear 53, causing the carriage to move from right to left and cut an inclined kerf (the kerf D) in the bolt. The slide rod, upon reaching the end of its stroke and starting its return travel, first again acts through the shuttle arm 74 to swing an advance lever, this time the left-hand lever as chain 73 tightens and turns the power arm of such left-hand advance lever. Passing turning motion to roll 46 through the dog 75 of the left-hand advance lever, and to roll 45 through the chain 68 which connects the left-hand advance lever and the right-hand retract lever, the directions of turn are now reversed, and namely made counter-clockwise for both rolls, which perforce advances the left-hand end of the roll in a degree greater than the right-hand end is retracted. The significance of advancing one and retracting the other end in differing degrees predetermined from the approximate ratio which exists between the stroke travel of the bolt and its overall length is that the axis about which the bolt is rocked approximately coincides with the saw blade. Following this oppositely directed rocking action. the slide rod in its further left-to-right travel picks up the carriage to again cut an inclined kerf (the kerf E) in the bolt. These described 4-stage cycles are repeated until the saw blade emerges from the back side of the bolt.

It will be seen from the foregoing description that the simple adjustments provided for the machine are easily and quickly made. Rough, irregular bolts are processed with maximum efficiency. Should a long bolt within the prescribed 38" to 42" limits be introduced to the machine the slide bar then has a shorter travel before "picking up" the carriage than where a short bolt is being processed. The saw cut is proportionately longer. In this way the butt or weather-end portions of shakes are all of equal length even though the bolts from which the same are produced vary in length. It is only the lengths of the sawed tip portions which vary.

It is thought that the machine, and the manner of its operation, will have been clearly understood from the foregoing detailed description of my now-preferred illustrated embodiment. Changes in the details of construction may be resorted to without departing from the spirit of the invention and it is accordingly my intension that no limitations be implied and that the hereto annexed claims be given the broadest interpretation to which the employed language fairly admits.

What I claim is:

1. A machine for producing the described shake blocks from a shake bolt of substantially greater length, comprising: gripping means for supporting the bolt, a narrow power-driven double-edged saw blade performing its cutting function by travel endwise to its length, and means for establishing such relative motion between the supported bolt and the powered saw blade that the latter cuts a zig-zag kerf progressing transversely through a center portion of the bolt entering at one side and emerging at the other side of the bolt, said saw blade occupying a localized station, said means for establishing the relative motion between the bolt and the saw blade including means for moving said gripping means relative to said saw blade through repeating four-stage cycles, the second and fourth stages being each a respective one of two oppositely directed strokes of reciprocation shuttling the bolt along a linear travel path which includes the saw blade and is longitudinal to the blade's cutting plane, the first and third stages being each one of two oppositely directed rocking movements in which the bolt turns about a respective center which lies intermediate the ends of the bolt and approximately coincides with the saw blade and positions the bolt so that its longitudinal median line is moderately inclined in opposite direction from said linear travel path.

2. A machine according to claim 1 in which the support for the bolt comprises a shuttle-mounted carriage having separated wheels journaled thereon for rotation about longitudinally spaced axes paralleling the cutting plane of the saw blade and provided in their periphery with means for establishing and maintaining throughout the duration of the zig-zag cut a firm grip upon the ends of a shake bolt introduced between the same.

3. A machine for producing the described shake blocks from a shake bolt of substantially greater length, comprising: a machine frame, a carriage mounted from the frame for reciprocating travel along a linear path, means for supporting a shake bolt on the carriage, drive means for operating the carriage in its reciprocatory travel, a narrow power-driven double-edged saw blade mounted from the frame for travel endwise to its length along a cutting path normal to the travel path of the carriage and traversed by a bolt supported on the carriage, said cutting path being spaced inwardly from and approximately centered with respect to the limits to which the opposite ends of the bolt move as the bolt travels with the carriage, said bolt supporting means including means for rocking said bolt relative to said carriage, and means timed to operate said rocking means as the carriage reaches each of the two end limits of its reciprocal travel for imparting to the supported bolt a respective one of two oppositely directed movements each rocking the bolt in a corresponding minor degree about an axis which approximately coincides with the cutting path of the saw blade into positions inclining the longitudinal median line of the supported bolt in opposite directions from the travel path of the carriage.

4. A machine according to claim 3 in which the carriage comprises two sections yieldingly urged one toward the other, and wherein the means for supporting a bolt on the carriage comprises opposing jaws each carried by a respective one of the two sections.

5. A machine according to claim 3 in which the carriage comprises two sections yieldingly urged one toward the other, and wherein the means for supporting a bolt on the carriage comprises a pair of rolls each journaled from a respective one of the carriage sections for turning movement about an axis paralleling the cutting path of the saw blade and each acting by its peripheral surface to firmly grip the related end of a bolt introduced between the rolls, the rocking of the bolt being performed by turning the rolls such that each of the two rolls shifts the related end of the bolt in a respective one of two opposite directions lateral to the travel path of the carriage.

6. A machine according to claim 5 in which said peripheral surfaces of the rolls are spur-toothed.

7. A machine according to claim 5 in which the means for operating the carriage and for rocking the bolt are both driven from a common source of power.

8. A machine according to claim 3, said carriage being comprised of two sections yieldingly urged one toward the other and having upon each of said sections a respective one of two rolls journaled for turning movement about axes spaced longitudinally of the carriage parallel with the cutting path of the saw blade and serving as the supporting means for the shake bolt by gripping the latter between the same, rocking of the bolt being accomplished by turning the rolls such that the same shift related ends of the bolt in opposite lateral directions one advancing and the other retracting the bolt end relative to the travel path of the carriage, the means to perform said rocking comprising, for each roll, a respective set of two levers comprised of a bell-crank advance lever and a first-order retract lever each having the center of the roll as its fulcrum, and so formed and connected, the advance lever of one set with the retract lever of the other set, that the two swing in concert in either rotary direction through arcs of travel having the same ratio, approximately, as that which exists, at the moment of rocking, between the distance to which the saw blade is removed from the distal end of the bolt and the distance to which the blade is removed from the proximal end of the bolt, connecting means being provided between the levers and rolls causing each advance lever to turn its roll only when the advance lever swings in one of its two rotary directions and the retract lever to turn its roll only when the other of the two rolls is turned by the latter's advance lever, the direction in which each advance lever swings in order to turn the related roll being opposite as between the two advance levers.

9. A machine is claimed in claim 8 in which the connection with the rolls from the two said levers in each of said sets comprises a ratcheting dog in the instance of one lever and a friction brake in the instance of the other lever.

10. A machine as claimed in claim 3 in which the means for supporting a bolt on the carriage comprises a pair of spur toothed rolls journaled from the carriage for turning movements about axes paralleling the cutting path of the saw blade and acting by said spur teeth to firmly grip the two ends of a bolt introduced between the rolls, means being provided for so turning said rolls as a step preliminary to a saw-cutting operation that a bolt introduced between the rolls is "walked" toward the saw-blade into immediate proximity thereof before the carriage is caused by said drive means to start an initial stroke of its reciprocatory travel.

References Cited

UNITED STATES PATENTS

| | | | |
|---|---|---|---|
| 355,077 | 12/1886 | Hanks et al. | 143—12 |
| 972,562 | 10/1910 | Moore | 143—8 |

DONALD R. SCHRAN, Primary Examiner

U.S. Cl. X.R.
143—8, 13; 144—13